United States Patent
Miyaoh

[11] Patent Number: 5,975,540
[45] Date of Patent: Nov. 2, 1999

[54] GASKET WITH COMPRESSIBLE SEALING SECTION AND HARD PRESSURE AFFECTING SECTION

[75] Inventor: Yoshio Miyaoh, Tokyo, Japan

[73] Assignee: Ishikawa Gasket Co., Ltd., Tokyo, Japan

[21] Appl. No.: 08/991,540

[22] Filed: Dec. 16, 1997

[30] Foreign Application Priority Data

Dec. 27, 1996 [JP] Japan .................................. 8-358642

[51] Int. Cl.$^6$ ................................................ F16J 15/06
[52] U.S. Cl. ........................................ 277/593; 277/596
[58] Field of Search ................................... 277/591, 592, 277/593, 596, 594, 650, 652, 654

[56] References Cited

U.S. PATENT DOCUMENTS

| | | | |
|---|---|---|---|
| 2,026,854 | 1/1936 | Victor | 277/593 X |
| 3,837,657 | 9/1974 | Farnam et al. | |
| 3,854,736 | 12/1974 | Farnam | 277/633 |
| 3,863,936 | 2/1975 | Farnam et al. | |
| 3,889,961 | 6/1975 | Farnam | 277/592 |
| 3,950,576 | 4/1976 | Desverchere | 427/284 |
| 4,213,620 | 7/1980 | Kennedy et al. | 277/592 |
| 4,743,421 | 5/1988 | McDowell et al. | |
| 4,754,982 | 7/1988 | Udagawa et al. | |
| 4,830,698 | 5/1989 | DeCore et al. | |
| 4,977,018 | 12/1990 | Irrgeher et al. | 277/652 X |
| 5,297,806 | 3/1994 | Kestly | 277/591 |
| 5,611,549 | 3/1997 | Forry | 277/593 |

FOREIGN PATENT DOCUMENTS

| | | |
|---|---|---|
| 2 550 601 | 2/1985 | France . |
| 35 09 136 | 9/1986 | Germany . |
| 2 101 239 | 1/1983 | United Kingdom . |

*Primary Examiner*—Anthony Knight
*Assistant Examiner*—Lewis Nguyen
*Attorney, Agent, or Firm*—Kanesaka & Takeuchi

[57] ABSTRACT

A gasket of the invention is formed of a gasket member extending substantially throughout an entire area to be sealed. The gasket member includes a base metal plate and at least one sealing member disposed on at least one of surfaces of the base metal plate. A sealing section and a pressure affecting portion are formed in the sealing member. The sealing section has a compressibility, while the pressure affecting portion has a height and compressibility less than those of the sealing section. When the gasket is tightened, the sealing section is compressed to securely seal around a hole to be sealed. The pressure affecting portion having less compressibility is formed near bolt holes, so that the gasket can be tightened easily without gradually decreasing its tightening pressure.

9 Claims, 2 Drawing Sheets

GASKET WITH COMPRESSIBLE SEALING SECTION AND HARD PRESSURE AFFECTING SECTION

BACKGROUND OF THE INVENTION AND RELATED ART STATEMENT

The present invention relates to a gasket having a sealing member with a compressible sealing section and a hard pressure affecting section. More particularly, the gasket is formed of a base metal plate and at least one sealing member fixed onto or disposed on one side of the base metal plate, wherein the sealing member is basically formed of a foamed rubber and includes the compressible sealing section and the pressure affecting section harder than the compressible sealing section.

A conventional gasket formed of a metal plate and a sealing member made of foamed rubber and fixed to or disposed on the metal plate has been known and widely used as a cylinder head gasket disposed between a cylinder head and a cylinder block.

In this conventional gasket, since the sealing member is formed of the foamed rubber, the gasket can provide a good sealing ability. However, when the gasket is situated between the cylinder head and the cylinder block and is tightened by bolts, the foamed rubber at the areas around the bolts is gradually pressurized and crushed. As a result, the tightening pressures by the bolts are gradually reduced. Therefore, unless the bolts are tightened when the surface pressures by the bolts are reduced, the required surface pressures can not be maintained.

The present invention has been made in view of the conventional problems, and an object of the present invention is to provide a gasket with a sealing member made of foamed rubber, which can prevent or reduce a surface pressure reduction when the gasket is tightened.

Another object of the invention is to provide a gasket as stated above, wherein a sealing area around a hole to be sealed can be securely sealed by the foamed rubber.

A further object of the invention is to provide a gasket as stated above, which can be used as a regular gasket for connecting two members and an engine gasket.

Further objects and advantages of the invention will be apparent from the following description of the invention.

SUMMARY OF THE INVENTION

A gasket of the invention is used for sealing around a hole of an internal combustion engine, such as a manifold gasket, cylinder head gasket and so on. However, it is possible to seal around a hole of any required device.

The gasket is formed of a gasket member extending substantially throughout an entire area to be sealed for constituting the gasket and including a base metal plate and at least one sealing member disposed on at least one of the surfaces of the base metal plate. The gasket also includes at least one first hole corresponding to a hole to be sealed, and a plurality of second holes situated near the first hole for receiving bolts therein to tighten the gasket.

In the invention, the gasket is provided with a sealing section formed in the at least one sealing member and having a compressibility for providing a surface pressure thereon when the gasket is tightened, and a pressure affecting portion formed in the sealing member excluding the sealing section. The pressure affecting portion has a height and compressibility less than those of the sealing section, so that the sealing section is substantially fully tightened when a tightening pressure is applied thereto.

Preferably, the sealing member is formed of a foamed rubber having small holes therein. The sealing section has closed small holes therein to provide the compressibility and form the surface pressure thereon, and the pressure affecting portion has crushed small holes therein by crushing the small holes of the foamed rubber in advance. Thus, the pressure affecting portion has substantially no compressibility or elasticity.

When the gasket is installed between two engine parts and is compressed, the tightening pressure is at first applied to the sealing section, not the pressure affecting portion to flatten the sealing section. After the sealing section is compressed to the height equal to the pressure affecting portion, the tightening pressure is applied over the entire surface of the gasket member including the sealing section and the pressure affecting portion. Since the pressure affecting portion does not have or has a very little compressibility, when the gasket is tightened thereafter, the pressure affecting portion can be substantially fully compressed. The tightening pressures of the bolts are not substantially reduced as time goes by.

Also, since the pressure affecting portion is not compressed when the gasket is at first tightened, the tightening pressure is concentrated at or fully applied to the sealing section. Namely, the tightening pressure is entirely utilized to seal around the hole without compressing the pressure affecting portion. Therefore, although the sealing member is formed of the foamed rubber, the sealing can be made securely around the hole for a long time.

In this respect, if there is no pressure affecting portion, which has the height and compressibility less than those of the sealing section, the tightening pressure is equally distributed on the entire gasket including the pressure affecting portion. Since the pressure affecting portion is compressed by the tightening pressure, the sealing member or the foamed rubber can not be compressed sufficiently. As a result, the surface pressure is reduced as time goes by, and the gasket must be tightened whenever the surface pressure is reduced. Otherwise, the sealing can not be maintained properly.

In the invention, although the gasket has the sealing member formed of the foamed rubber, the gasket can be sealed securely without the surface pressure loss.

In the invention, the sealing section surrounds the hole to be sealed, and projects outwardly relative to an upper surface of the pressure affecting portion in a direction away from the base metal plate. The sealing section may have the constant width and height throughout the entire length thereof. The pressure affecting portion is located immediately outside the second or bolt holes to surround the same, and has the height constant throughout the entire length thereof.

The sealing section and pressure affecting portion may include a plurality of sealing areas and pressure affecting areas arranged substantially alternately with respect to each other along a sealing line surrounding the hole to be sealed.

In the invention, the sealing member may be fixed on an entire outer surface of the basic metal plate. Also, the sealing member may be laminated with one or more metal plates constituting the metal laminate gasket. If the metal plate includes a bead, the sealing section may be disposed on the bead.

3

DETAILED DESCRIPTION OF PREFERRED EMBODIMENTS

With reference to the drawings, the gaskets of the invention will be explained.

Figure 1:
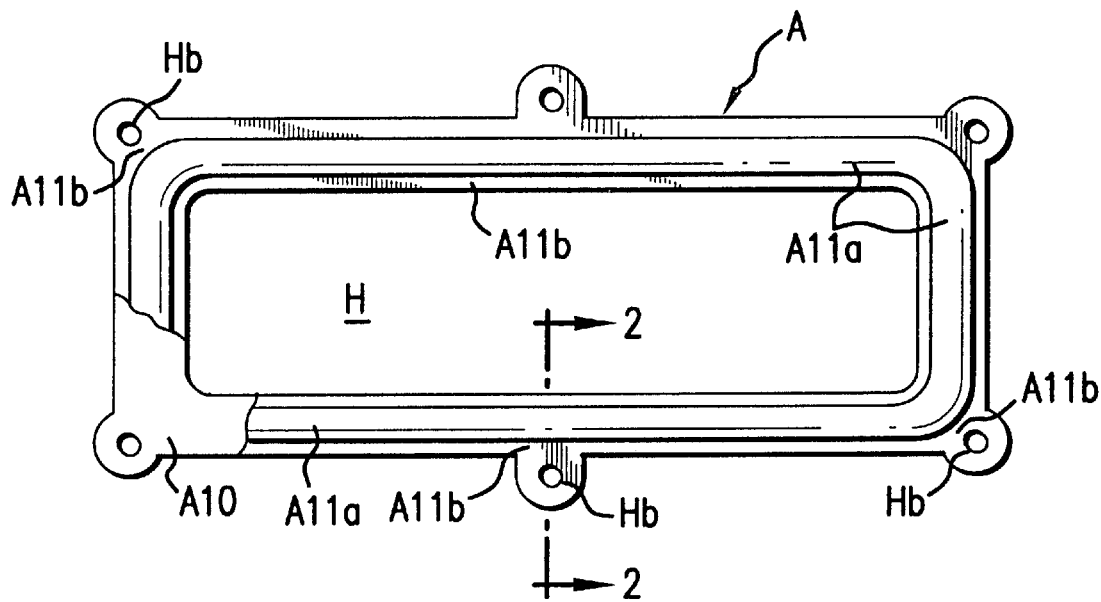
FIG. 1 is a plan view of a first embodiment of a gasket of the invention.
Figure 2:
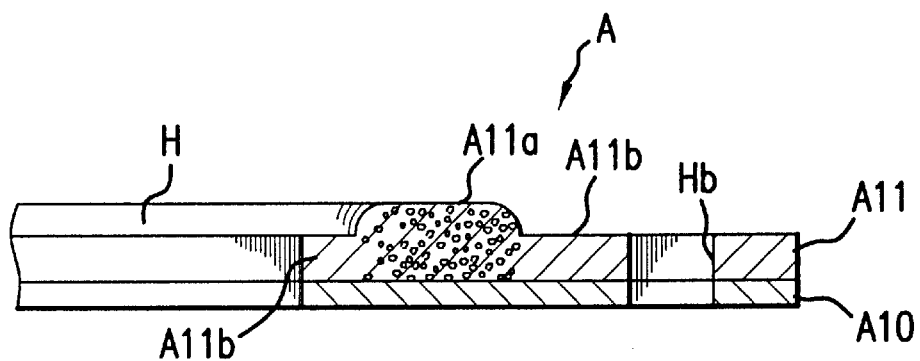
FIG. 2 is an enlarged cross sectional view taken along line 2—2 in FIG. 1.

FIGS. 1 and 2 show a first embodiment A of a gasket of the invention. The gasket A may be installed between engine parts, such as an oil pan and a cylinder block(both not shown). However, the gasket A may be used for general purposes, such as connecting pipes and mechanical parts.

The gasket A includes a hole H to be sealed, and a plurality of bolt holes Hb surrounding the hole H. Bolts (not shown) pass through the bolt holes Hb to connect the engine parts with the gasket A therebetween.

The gasket A is formed of a base metal plate A10, and an elastic sealing member A11 fixed or adhered onto an upper surface of the metal plate A10. The metal plate A10 is formed of a regular metal, such as stainless steel.

The elastic sealing member A11 is a foamed rubber sheet including small holes therein to provide elasticity. The foamed rubber may be made of silicon rubber, polyurethane rubber or fluorine rubber, which is superior in heat and wear resistances. However, the foamed rubber may be made of other materials. The foamed rubber sheet by itself used in the invention as the elastic sealing member A11 is known already in the art. Therefore, the explanation thereof is omitted.

In the invention, the elastic sealing member A11 includes a sealing section A11a surrounding the hole H to be sealed, and compressed portions or pressure affecting portions A11b extending both sides of the sealing section A11a including areas around the bolt holes Hb. The sealing section A11a includes therein a large number of closed small holes to provide resiliency thereat, but the compressed portions A11b do not have closed small holes for providing resiliency.

The sealing section A11a has the constant width and height around the hole H. The compressed portions A11b formed on both sides of the sealing section A11a and around the bolt holes Hb have the constant height.

When the elastic sealing member A11 is formed, at first, the foamed rubber sheet having the small holes therein already known in the art is prepared. Then, the compressed portions A11b are compressed to eliminate or break the small holes therefrom. When the pressure is applied, the closed small holes are substantially broken. After the pressure to the compressed portions A11b is removed, the compressed portions A11b stay in the compressed condition, and the sealing section A11a projects outwardly from the upper surface of the compressed portions A11b.

Since the sealing section A11a has the small holes, the sealing section A11a has resiliency. However, since the compressed portions A11b do not substantially have the small holes therein, i.e. the small holes for providing resiliency are broken, the compressed portions do not have resiliency like the sealing section A11a.

When the gasket A is situated between the engine parts (not shown) and is tightened, the sealing section A11a mostly provides resilient surface pressure, but the compressed portions A11b do not substantially provide resiliency or provide very little resilient surface pressure. Also, when the gasket A is tightened, the tightening pressure is mostly applied to the sealing section A11a. The combination of the resilient surface pressure at the sealing section and less resilient surface pressure at the compressed portions can securely seal around the hole H.

Since the compressed portions A11b are not compressed too much like the sealing section A11a when the gasket A is tightened, the tightening pressure is mostly applied to the sealing section A11a. Also, when the gasket A is tightened, the compressed portions A11b especially around the bolt holes Hb are not gradually pressed. Therefore, the tightening pressures by the bolts do not substantially decrease around the bolts as time goes by. Accordingly, the decrease of the surface pressure around the hole H can be properly prevented, and the sealing is made properly around the hole H.

Figure 3:
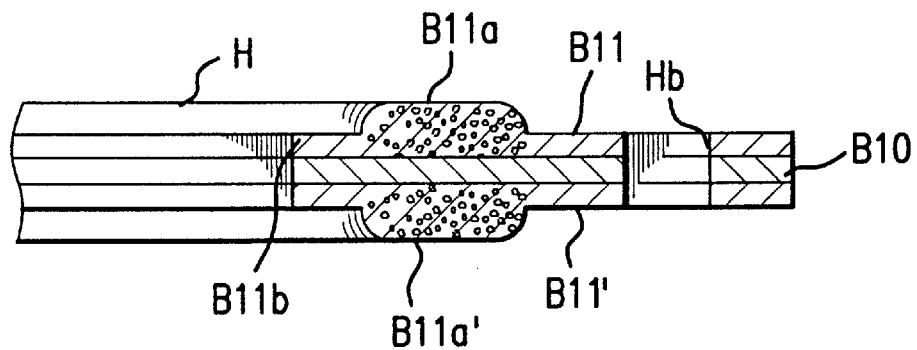
FIG. 3 is an enlarged cross sectional view similar to FIG. 2 for showing a second embodiment of the gasket of the invention.

FIG. 3 shows a second embodiment B of the gasket of the invention. The gasket B includes a base metal plate B10 and an elastic sealing member B11 with a sealing section B11a and compressed portions B11b, similar to the gasket A. Further, the gasket B includes an elastic sealing member B11' with the sealing section B11a' similar to the elastic sealing member B11 at the opposite side of the base metal plate B10. Namely, the elastic sealing members are provided on both sides of the base metal plate B10. The gasket B operates as in the gasket A.

Figure 4:
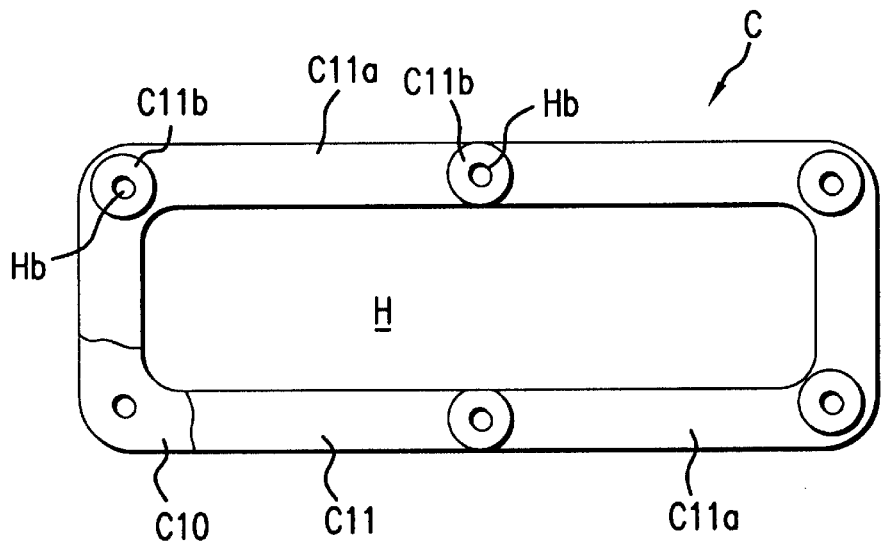
FIG. 4 is a plan view of a third embodiment of a gasket of the invention.

FIG. 4 shows a third embodiment C of the gasket of the invention. The gasket C includes a base metal plate C10 and an elastic sealing member C11, similar to the gasket A. In the gasket A, the sealing section A11a has the constant width, but the gasket C has compressed portions C11b in a sealing section C11a. Namely, the sealing section C11a continues at the corner portions, but is interrupted at the middle portions by the compressed portions C11b.

Since the compressed portions C11b are formed around the bolt holes, the bolts can be tightened sufficiently without being affected by the sealing section C11a with the small holes. When the gasket C is tightened, the sealing section C11a is compressed nearly to the height of the compressed portions C11b. Thereafter, the gasket can be evenly compressed. Therefore, the gasket C can provide a surface pressure around the hole H continuously without interruption to securely seal around the hole H. The gasket C can operate as in the gasket A.

Figure 5:
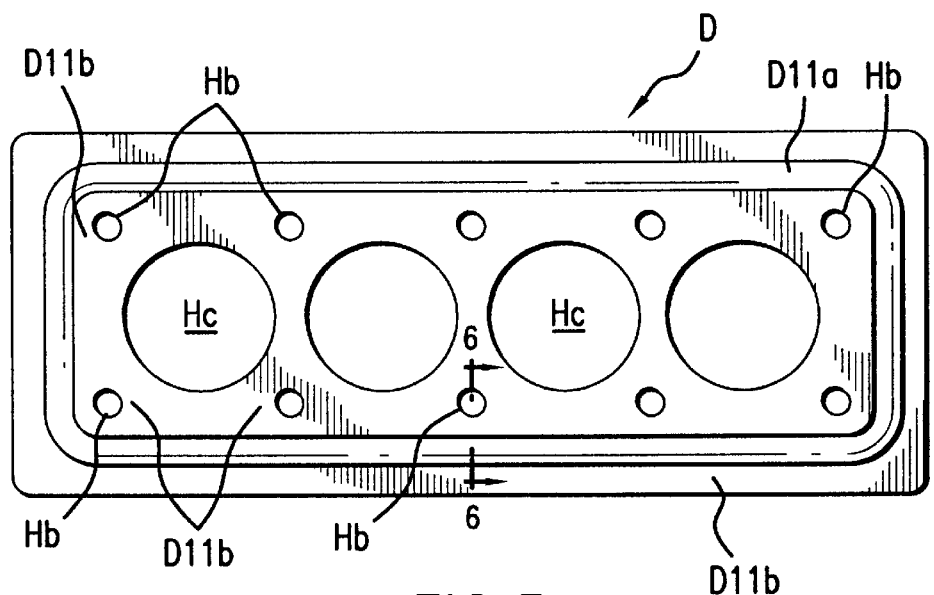
FIG. 5 is a plan view of a fourth embodiment of a gasket of the invention formed as a cylinder head gasket.
Figure 6:
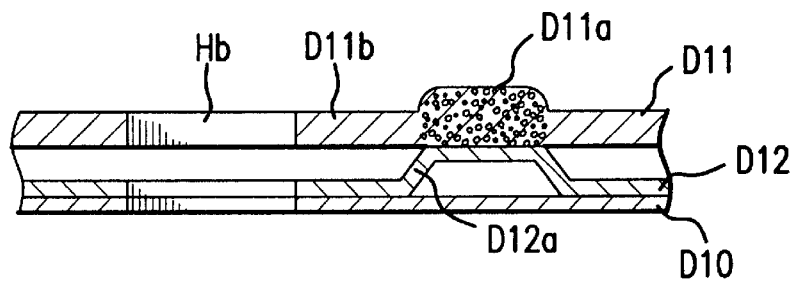
FIG. 6 is an enlarged cross sectional view taken along line 6—6 in FIG. 5.

FIGS. 5 and 6 show a fourth embodiment D of a metal laminate gasket of the invention. The gasket D is a cylinder head gasket having a plurality of cylinder bores Hc and bolt holes Hb. The gasket D further includes water holes, oil holes, and so on as in the conventional gasket, but these holes are omitted therefrom.

The gasket D is formed of metal plates D10, D12 and an elastic sealing member D11 disposed on the metal plate D12, which extend substantially throughout an entire area of the gasket D. The metal plate D12 includes a bead D12a along the outer periphery thereof. The elastic sealing member D11 includes a sealing section D11a around the outer periphery, and compressed portions D11b on both sides of the sealing section D11*a*, as in the elastic sealing member A11. Namely, the sealing section D11*a* contains small holes to provide resiliency, while the compressed portions D11*b* do not have the closed holes or cells, or have very little resiliency. The sealing section D11*a* is located on the bead D12*a* to provide high compressible resiliency along the periphery of the gasket D together with the bead D12*a*.

In the compressed portions D11*b* inside the sealing section D11*a*, the bolt holes Hb and the cylinder bores Hc are located. Since the bolt holes Hb are located in the compressed portion D11*b*, when the gasket D is tightened, bolts can be tightened sufficiently. The tightening pressure is not gradually reduced.

In FIGS. 5 and 6, no special sealing means is shown around the cylinder bores Hc, but beads or other sealing means may be formed around the cylinder bores Hc and other holes to securely seal therearound. Also, the elastic sealing member D11 is disposed on the metal plate D12 with the bead D12*a*, but the elastic sealing member D11 may be placed on a metal plate without a bead. The elastic sealing member D11 may be disposed between two metal plates.

In the invention, the elastic sealing member has one compressible sealing section, but a plurality of compressible sealing sections may be formed at portions away from the bolt holes on one elastic sealing member to seal around the individual holes.

In the invention, since the compressed portions are formed around the bolt holes, although the sealing member is basically formed of the compressible material, when the gasket is tightened, the tightening pressure does not gradually decrease. The gasket can securely seal around the required holes.

While the invention has been explained with reference to the specific embodiments of the invention, the explanation is illustrative, and the invention is limited only by the appended claims.

What is claimed is:

1. A gasket for sealing around a hole comprising:
    a gasket member for constituting the gasket, said gasket member including a base metal plate, at least one sealing member formed of foamed rubber having small holes therein and disposed on at least one of surfaces of the base metal plate, at least one first hole corresponding to a hole to be sealed, and a plurality of second holes situated near the first hole adapted to receive bolts therein for tightening the gasket,
    sealing section formed in the at least one sealing member and having closed small holes therein to form a compressibility for providing a surface pressure thereon when the gasket is tightened, and
    a pressure affecting portion formed in the sealing member excluding the sealing section and having crushed small holes therein by crushing the small holes of the foamed rubber in advance, said pressure affecting portion having a height and compressibility less than those of the sealing section so that the sealing section is substantially fully tightened when a tightening pressure is applied thereto.

2. A gasket according to claim 1, wherein said sealing section is located to surround the hole to be sealed, and said second holes are located in the pressure affecting portion.

3. A gasket according to claim 1, wherein said sealing section projects outwardly relative to an upper surface of the pressure affecting portion in a direction away from the base metal plate.

4. A gasket according to claim 3, wherein said sealing section has constant width and height throughout an entire length thereof, and said pressure affecting portion has the height constant throughout an entire length thereof.

5. A gasket according to claim 4, wherein said at least one sealing member is fixed on an entire outer surface of the base metal plate.

6. A gasket according to claim 4, wherein said base metal plate includes a first metal plate and a second metal plate laminating on the first metal plate, said second metal plate having a bead around the hole to be sealed, said sealing section being located on the bead.

7. A gasket according to claim 3, wherein said sealing section has the constant width and height continuously throughout the entire length thereof.

8. A gasket according to claim 7, wherein said pressure affecting portion is located at an inside portion and an outside portion relative to the sealing section with the hole to be sealed therein.

9. A gasket according to claim 3, wherein said sealing section and pressure affecting portion include a plurality of sealing areas and pressure affecting areas arranged alternately with respect to each other around the hole to be sealed.

* * * * *